US008651588B2

United States Patent
Bensch et al.

(10) Patent No.: US 8,651,588 B2
(45) Date of Patent: Feb. 18, 2014

(54) ELECTRO-PNEUMATIC BRAKE CONTROL DEVICE

(75) Inventors: Uwe Bensch, Hannover (DE); Henning Förster, Nordstemmen (DE); Bernd-Joachim Kiel, Wunstorf (DE); Wilfried Menze, Springe (DE); Hartmut Rosendahl, Hannover (DE); Otmar Struwe, Hannover (DE)

(73) Assignee: WABCO GmbH, Hannover (DE)

( * ) Notice: Subject to any disclaimer, the term of this patent is extended or adjusted under 35 U.S.C. 154(b) by 852 days.

(21) Appl. No.: 12/084,500

(22) PCT Filed: Oct. 20, 2006

(86) PCT No.: PCT/EP2006/010152
§ 371 (c)(1),
(2), (4) Date: Feb. 18, 2009

(87) PCT Pub. No.: WO2007/073791
PCT Pub. Date: Jul. 5, 2007

(65) Prior Publication Data
US 2009/0184568 A1  Jul. 23, 2009

(30) Foreign Application Priority Data
Dec. 16, 2005 (DE) .......................... 10 2005 060 225

(51) Int. Cl.
*B60T 8/32* (2006.01)
(52) U.S. Cl.
USPC .......... 303/115.2; 303/7; 303/9.61; 303/9.63; 303/15; 303/20; 701/70; 701/78; 701/83
(58) Field of Classification Search
USPC .................. 303/15, 20, 115.2, 127, 17, 3, 89; 701/78; 188/3 H; 180/271
See application file for complete search history.

(56) References Cited

U.S. PATENT DOCUMENTS

| | | | | |
|---|---|---|---|---|
| 5,466,053 A * | 11/1995 | Koelzer | ............................ | 303/7 |
| 5,601,160 A | 2/1997 | Horsch | | |
| 2002/0175561 A1 * | 11/2002 | Jensen | ........................ | 303/113.1 |
| 2005/0029859 A1 * | 2/2005 | Bensch et al. | .................. | 303/89 |
| 2006/0244305 A1 * | 11/2006 | Hilberer | ......................... | 303/15 |

FOREIGN PATENT DOCUMENTS

| | | |
|---|---|---|
| DE | 199 53 805 C1 | 6/2001 |
| DE | 102 47 812 C1 | 10/2003 |
| DE | 102 51 249 A1 | 12/2003 |
| EP | 1 571 061 B1 | 9/2005 |
| GB | 1 411 892 | 10/1975 |

* cited by examiner

*Primary Examiner* — Robert A Siconolfi
*Assistant Examiner* — San Aung
(74) *Attorney, Agent, or Firm* — Kramer Levin Naftalis & Frankel LLP

(57) ABSTRACT

An electro-pneumatic brake control device is provided for controlling the parking brake of a vehicle having compressed-air-actuated brake cylinders, at least one of which is a spring brake cylinder with a spring store part. Valve devices place the brake control device into various operating states. In a first operating state, the valve devices are at least partially supplied with current and switched such that a compressed air line to the spring store part of the spring brake cylinder is aerated. In a second state, the valve devices are at least partially supplied with current and switched such that the compressed air line is deaerated. In a third state, which can be activated in the event of failure of the electrical energy supply of the brake control device, the valve devices are switched to a currentless state such that the compressed air line is automatically deaerated in throttled manner.

10 Claims, 2 Drawing Sheets

ELECTRO-PNEUMATIC BRAKE CONTROL DEVICE

FIELD OF THE INVENTION

The present invention relates generally to an improved electro-pneumatic brake control device for controlling the parking brake of a vehicle.

BACKGROUND OF THE INVENTION

EP 1 571 061 A1 describes a brake control device and brake system of the general type under consideration. Such systems provide a service brake, which can be actuated by means of a brake pedal, and a parking brake (often also referred to as a handbrake), which can be actuated by means of an electric signal transducer.

The failure of the electric power supply can be a problematic event in such electrically controlled brake systems, as electric components, such as electric control systems and electrically actuated solenoid valves, can no longer be actuated. Furthermore, electric signal transducers for the parking brake also can fail as a result of such power failures. DE 199 53 805 C1 therefore proposed that emergency braking be initiated automatically by venting a spring actuator that acts on the parking brake. Automatic emergency braking can be disadvantageous, however, since it involves maximum braking action, which may present a hazard by reason of traffic following the braking vehicle.

EP 1 571 061 A1 proposed a brake system by which, in the event of failure of the electric power supply, the vehicle can be braked gradually by actuating the brake pedal under pneumatic control of the spring store parts of the spring brake cylinders. However, this solution has the disadvantage that the spring brake cylinders are repressurized as soon as the brake pedal is no longer being actuated, with the result that the parking brake is released once again. Thus, with this known system, the vehicle cannot be safely parked.

SUMMARY OF THE INVENTION

Generally speaking, in accordance with the present invention, embodiments of an improved electro-pneumatic brake control device for a vehicle parking brake control system are provided that overcome disadvantages associated with conventional devices.

The electro-pneumatic brake control device according to embodiments of the present invention enables a vehicle to be braked slowly and parked safely even in the event of the failure of the on board power supply, especially the electric power supply of the brake control device, and the associated failure of an electro-pneumatically actuated parking brake. This is advantageous, in particular, since the vehicle engine also fails in the event of power supply failure. As a result, a compressed air generating compressor can no longer deliver compressed air for the compressed air brakes to the compressed air reservoir tank. This means that the remaining number of possible braking operations using the service brake is limited. It is, therefore, important that the vehicle be brought safely into a parked position in the event of the failure of the electric power supply.

By virtue of the present invention, the brake control device can be brought into an operating condition in which the compressed air line leading to the spring store part of the spring brake cylinder is vented in throttled manner in the event of failure of the electric power supply when valve devices are deenergized. Because of the throttled venting of the spring store part, the parking brake is applied slowly and the vehicle is braked slowly. This benefits traffic safety as following traffic is not endangered by an emergency braking operation.

In a preferred embodiment, the inventive electro-pneumatic brake control device is provided with an air flow boosting valve device, such as, for example, a relay valve, having an inlet in communication with a compressed air line to a compressed air reservoir, an outlet in communication with the compressed air line to the spring store part of the spring brake cylinder, and a pneumatic control input for supplying control pressure for controlling the pressure at the outlet of the air flow boosting valve device. In the aforesaid operating condition of the brake control device which is activated in the case of failure of the electric power supply, the control pressure is automatically lowered in throttled manner. Venting of the spring brake cylinders therefore is effected by means of a valve device, which, in turn, is controlled via a control pressure. The control volume needed for control of such a valve device is small relative to the working volume controlled by the valve device. This valve device, therefore, boosts the air flow supplied or exhausted via the control line—the boosted air flow being supplied to or exhausted from the spring brake cylinder. Thus, by throttled venting of the control pressure of the air flow boosting valve device, throttled venting of the spring store part of the spring brake cylinder is also achieved.

Advantageously, an electrically actuated monostable valve, such as, for example, a 3/2 way solenoid valve, is connected to an electric control unit and electrically controlled by this control unit, the inlet of which valve can be placed in communication with the compressed air line to the compressed air supply and the outlet in communication with the control input of the air flow boosting valve device. In an energized driving position of the monostable valve, its outlet is in communication with its inlet, and, in deenergized parked position, its outlet is in communication, via a third port of the monostable valve, with a throttled venting device. This monostable valve is designed such that, in deenergized condition, it is brought into the parked position, for example by means of preloading of a spring. Thus, the condition of the monostable valve is defined in case of failure of the electric power supply. Specifically, throttled venting of the control chamber of the air flow boosting valve device then takes place, and, so, the parking brake is applied slowly by means of the spring brake cylinders.

Preferably, the air flow boosting valve device is designed as a relay valve, wherein the relay piston has an aperture that places the outlet of the relay valve in communication with its control input in throttled manner. This aperture in the relay piston is provided as an orifice or bore. It offers the advantage that an orifice provided on the throttled venting device can be configured with a definite minimum size. Specifically, the control volume of such a relay valve is usually very small and, so, it vents very rapidly. However, rapid venting may lead to abrupt braking. In order to avoid rapid venting, an orifice on the corresponding venting device would, therefore, have to be of very small size. However, this can lead to problems. Especially in the case of fouling or icing, the danger exists that venting may no longer take place properly. Because of the aperture provided in the relay piston of the relay valve in this preferred embodiment of the present invention, the working volume of the relay valve is slowly reduced via the aperture in the relay piston and, thus, also via the throttled venting device. The control volume of the relay valve therefore appears to be virtually increased. As a result, the orifice provided on the throttled venting device can be configured with a larger cross section, and, as a result, stopping up or clogging of the venting device due to fouling, icing, etc. is prevented.

It is thus an object of the present invention to provide an electro-pneumatic brake control device for a vehicle parking brake control system that enables the vehicle to be braked slowly and parked safely even in the event of failure of the electric power supply and the associated failure of the electro-pneumatically actuated parking brake.

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

The present invention will be described in more detail hereinafter on the basis of the accompanying drawings, wherein.

DETAILED DESCRIPTION OF THE PREFERRED EMBODIMENTS

Figure 1:
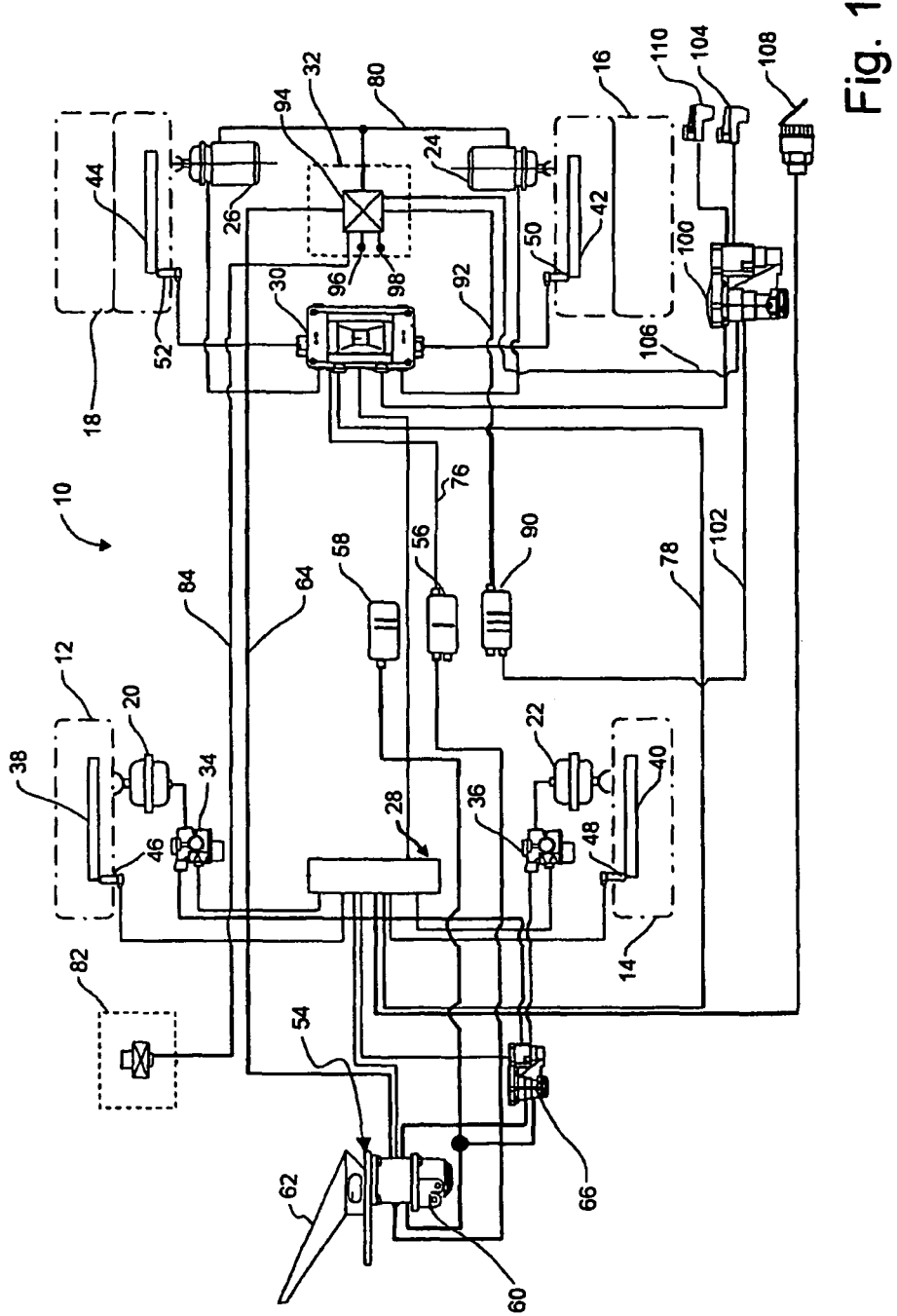
FIG. 1 is a schematic diagram of a compressed air brake system having an electro-pneumatic brake control device for controlling a parking brake.

Referring now to FIG. 1, a vehicle compressed air brake system will first be discussed in general terms in order to set the stage for a detailed discussion of the inventive electro-pneumatic device for controlling a parking brake integrated into such a compressed air brake system. FIG. 1 schematically shows a compressed air brake system 10 for a vehicle having four wheels 12, 14, 16, 18. Brake system 10 is electrically controlled, meaning that the injection of brake pressure to brake cylinders 20, 22, 24, 26 of wheels 12, 14, 16, 18 is controlled by electric and electronic control elements. Brake cylinders 20, 22 of front wheels 12, 14 are controlled by a front axle brake control module 28, and brake cylinders 24, 26 of rear wheels 16, 18 are controlled by a rear axle brake control module 30. Brake cylinders 24, 26 of rear wheels 16, 18 are designed as combined service and spring brake cylinders, wherein the spring store parts are controlled by an electro-pneumatic brake control device for controlling the parking brake, namely, a parking brake module 32.

Electromagnetically actuated valves for influencing the brake pressure are connected upstream from each brake cylinder 20, 22, 24, 26. For front wheels 12, 14, valves 34, 36 are used for this purpose. For rear wheels 16, 18, the respective valves are integrated in rear axle brake control module 30.

Sensors for determining the speeds of revolution of the respective wheels are mounted on each wheel 12, 14, 16, 18. Each of the speed sensors is provided with a magnet wheel 38, 40, 42, 44 connected to rotate with the respective wheel 12, 14, 16, 18 and coupled electromagnetically with an inductively operating wheel sensor 46, 48, 50, 52.

Brake system 10 is further provided with a brake force transducer 54 which senses the braking intent of the vehicle operator. Brake force transducer 54 comprises an electric and a pneumatic part. The pneumatic part is supplied with compressed air by a first compressed air reservoir tank 56 and a second compressed air reservoir tank 58. These compressed air reservoir tanks 56, 58 are used to supply compressed air to brake cylinders 20, 22 of front wheels 12, 14 or brake cylinders 24, 26 of rear wheels 16, 18, respectively. The pneumatic part of brake force transducer 54 is provided with a two circuit brake valve 60, which is mechanically connected to a brake pedal 62 and can be actuated by means of brake pedal 62. During actuation of brake pedal 62, a pressure signal is supplied from brake valve 60 via a compressed air line 64 to the parking brake module 32. A second pressure signal decoupled from this first pressure signal is supplied to a front axle valve device 66.

Front axle valve device 66 is provided with a front axle redundancy valve (not separately illustrated) and a pressure regulating valve device (not separately illustrated), such as a proportional relay valve, which converts an electric signal from front axle brake control module 28 into a pneumatic brake pressure.

Via a compressed air line, front axle valve device 66 is in communication with second compressed air reservoir tank 58. It is also connected via an electric line to front axle brake control module 28. In normal operation, pressure for brake cylinders 20, 22 is regulated by means of an electric signal supplied via the electric line. In what is known as a redundancy case, such as a failure of the electric power supply for the electric controller or a failure of the entire electric controller of the brake system or failure of individual control modules of the brake system, a changeover takes place to the pressure signal of brake force transducer 54. Compressed air can be supplied to valves 34, 36 by means of front axle valve device 66.

Via a pneumatic line 76, rear axle brake control module 30 is in communication with first compressed air reservoir tank 56. Rear axle brake control module 30 is also provided with a data interface, which is connected via an electric line 78 to a further data interface of front axle brake control module 28. Modules 28, 30 exchange data via these data interfaces. For example, rear axle brake control module 30 receives from front axle brake control module 28 the vehicle operator's braking intent sensed by means of brake force transducer 54 and controls the brake pressure in brake cylinders 24, 26 of rear wheels 16, 18 via valves disposed in rear axle brake control module 30. Rear axle brake control module 30 draws the compressed air necessary for this purpose from first compressed air reservoir tank 56.

Brake cylinders 24, 26 are designed as combination brake cylinders, namely, as combination spring-actuator/diaphragm cylinders. In addition to the function of diaphragm cylinders, which corresponds approximately to the function of brake cylinders 20, 22, brake cylinders 24, 26 have a spring-actuator function. Brake cylinders 24, 26 include a diaphragm part, which is in communication pneumatically with the service brake system of the rear axle and can be pressurized with the actual brake pressure, and a spring-actuator store part, which is pneumatically separated from the diaphragm part and can be pressurized with compressed air via separate compressed air lines. The spring store parts form part of the parking brake. The spring store parts include the spring actuator function, which preloads a spring actuator upon admission of compressed air to the spring store part and, thus, prevents or diminishes braking action of the spring actuator function, whereas the actuator springs relax upon venting of the spring store part and, thus, in connection with the spring actuator function, exert a braking action on the brake associated with the respective brake cylinder. In the present context, brake cylinders of this type are referred to as spring brake cylinders.

By means of these spring brake cylinders, a parking brake function is achieved that also permits the vehicle to be braked or immobilized even in the absence of compressed air. The parking brake function takes place when the respective spring store parts of spring brake cylinders 24, 26 are vented below a minimum pressure value. Via compressed air lines 80, the spring store parts of brake cylinders 24, 26 are pneumatically in communication with parking brake module 32, which permits pressure control by way of electronic control means.

A manually actuated parking brake signal transducer 82 is connected to parking brake module 32 via a multi-conductor electric line 84. The electric devices in the vehicle are supplied with electric power by an electric power supply device, not illustrated, such as a vehicle battery, via appropriate electric lines.

Via a compressed air line 92, a compressed air reservoir tank 90 is in communication with parking brake module 32. Compressed air reservoir tank 90 provides the compressed air supply for the parking brake circuit (and a coupled trailer).

Parking brake module 32 is further equipped with an input port 94 for the pressure signal supplied via compressed air line 64. Parking brake module 32 also has ports 96, 98 for the electric power supply and a data interface. Port 96 for the data interface is used for connection to a data bus system provided in the vehicle and also referred to as the vehicle bus. The vehicle bus is used for data exchange between various units provided in the vehicle containing an electronic controller, such as modules 28, 30, which, for this purpose, are also connected via respective data interface ports to the vehicle bus.

The vehicle described herein is suitable for coupling with a trailer and is also referred to as a "tractor" The unit comprising both the tractor and one or more trailers is referred to as a "vehicle train".

Brake system 10 is further provided with a trailer control valve 100, which is used for brake pressure control of a coupled trailer. For its compressed air supply, trailer control valve 100 is in communication via a compressed air line 102 with compressed air reservoir tank 90. In response to electric and pneumatic control signals, trailer control valve 100 delivers the compressed air drawn from compressed air reservoir tank 90 incrementally via a compressed air port 104 to the brake system of a coupled trailer. For control of this pressure delivery, trailer control valve 100 has an electric signal input, which is connected to rear axle brake control module 30 and via which trailer control valve 100 receives an electric signal that reflects the braking intent of the vehicle operator. Alternatively, the electric signal input can also be connected to front axle brake control module 28. A pressure control input for receiving pneumatic control signals is also provided. Via a compressed air line 106, the pressure control input is in communication with parking brake module 32.

An electric plug connection 108 is used for supplying power and transferring data signals to the trailer. A compressed air supply port 110 is also provided for supplying the trailer with reservoir pressure.

Brake system 10 is further provided with a compressed air supply system (not illustrated), such as a compressor driven by the vehicle engine and used to fill compressed air reservoir tanks 56, 58, 90 with compressed air.

The brake system described hereinabove corresponds largely to the brake system described in EP 1571061 A1. The functioning principles of this brake system bear on an understanding of the parking brake control module according to exemplary embodiments of the present invention, where the inventive module is integrated in such brake system as described in greater detail hereinafter.

Figure 2:
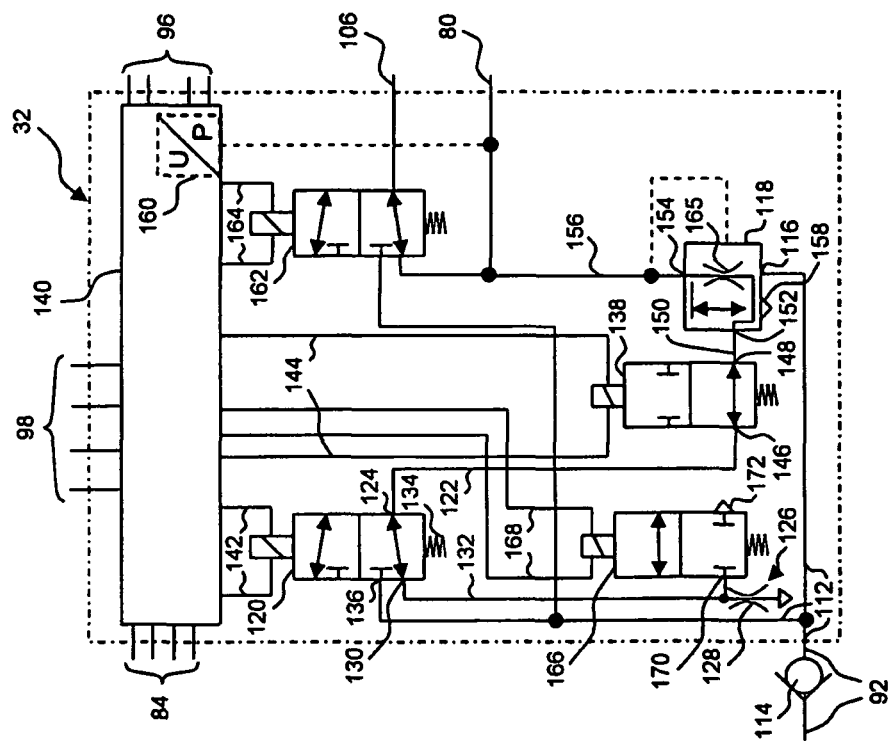
FIG. 2 is a schematic diagram depicting an electro-pneumatic brake control device for controlling the parking brake according to an exemplary embodiment of the present invention.

FIG. 2 schematically shows parking brake control module 32 according to an exemplary embodiment of the present invention. Compressed air line 92 is in communication with a compressed air supply line 112, which supplies valve devices within parking brake control module 32 with compressed air from compressed air tank 90. A check valve 114 is disposed in compressed air line 92, or at a portion of compressed air supply line 112 on the input side. Check valve 114, in the case of an unforeseen pressure drop in compressed air line 92, prevents a pressure drop in the compressed air lines within parking brake control module 32. An unforeseen pressure drop would be disadvantageous, since it would lead to application of the parking brake in unforeseen manner. Particularly, in the case of breakaway of the trailer or of a leak in the parking brake circuit, check valve 114 prevents the spring actuator of brake cylinders 24, 26 from being vented. Such venting would lead to application of the parking brake, thus, leading to dangerous emergency braking of the tractor.

Compressed air supply line 112 is in communication with inlet 116 of an air flow boosting valve device designed as relay valve 118, and it supplies compressed air from compressed air tank 90. In addition, a monostable valve 120, preferably a 3/2 way solenoid valve, is in communication with compressed air supply line 112 and, thus, with tank 90. Monostable valve 120 has a first switched position (parked or vented position) as illustrated in FIG. 2. In this position, an outlet 124 of monostable valve 120 in communication on the output side with a compressed air line 122 is in communication with a venting device 126, which is in communication indirectly or directly with the atmosphere. Venting device 126 has a throttle 128, which ensures that the compressed air can escape only slowly from line 122 via monostable valve 120. This throttle 128 comprises, for example, an orifice plate through which the compressed air must pass. As a result, the cross section is reduced, and, so, this orifice represents a resistance for the compressed air, which in parked or vented position of monostable valve 120 arrives at venting device 126 via compressed air line 122, a vent port 130 of monostable valve 120 and a compressed air line 132. This parked or vented position is occupied by monostable valve 120 when valve 120 is deenergized. For this purpose, the monostable valve is preloaded, for example by means of a spring 134.

In a second switched position (a pressure supplying position or driving position), monostable valve 120 places its inlet 136 in communication with its outlet 124, and, so, in this position, compressed air supply line 112 is in communication with compressed air line 122. This second switched position is activated in malfunction-free driving operation of the brake system. In this position, compressed air passes through compressed air line 122 to relay valve 118 via an interposed holding valve 138.

The positions of monostable valve 120 are switched via an electronic control unit 140 of parking brake control module 32. For this purpose, control unit 140 is electrically connected via electric lines 142 to monostable valve 120. As an example, if parking brake signal transducer 82 is actuated, control unit 140 switches monostable valve 120 to its driving position by delivering a corresponding electric signal or current. For this purpose, monostable valve 120 is continuously energized. As soon as this energizing current is turned off, the valve automatically returns to its parked position.

Holding valve 138, which can be a 2/2 way solenoid valve, for example, is connected via electric lines 144 to control unit 140. It can therefore be electromagnetically actuated via the control unit. In its switched position, illustrated in FIG. 2, this valve 138 allows compressed air to flow from compressed air line 122, which is in communication with an inlet 146 of holding valve 138, through to an outlet 148 of holding valve 138, which outlet is in communication via a further compressed air line 150 with a control input 152 of relay valve 118.

In a second switched position, not illustrated in FIG. 2, holding valve 138 blocks the compressed air flow. To achieve metered flow of compressed air, valve 138 can be activated by control unit 140, for example by a clocked signal via electric lines 144. In this way, control input 152 of relay valve 118 can be pressurized with a predetermined pressure.

In an alternative embodiment, holding valve 138 can be designed as a proportional valve, in which case proportional or at least quasi proportional passage cross sections can be adjusted between the extreme values of the passing position and the blocking position by activating the solenoids of this valve with suitable electric signals, such as clocked signals.

At its outlet 154, relay valve 118 delivers to a compressed air line 156 an output pressure that corresponds to the pressure injected via compressed air line 150 at control input 152 and, thus, into a control chamber of relay valve 118. Relay valve 118 draws the compressed air from compressed air supply line 112, which is in communication with inlet 116 of relay valve 118. Any venting of compressed air line 156 that may be necessary takes place via a vent outlet 158 of relay valve 118 indirectly or directly in communication with the atmosphere.

A pressure sensor 160 can, optionally, be provided on compressed air line 156 on the output side of relay valve 118. Pressure sensor 160 delivers an electric signal corresponding to the pressure in compressed air line 156 to electric control device 140, where it is evaluated as the actual pressure value.

Compressed air line 156 is in communication with compressed air line 80 leading to brake cylinders 24, 26. Compressed air line 156 is also in communication with a trailer checking valve 162. Valve 162 is desirably designed as a 3/2 way solenoid valve. By means of this valve, a trailer checking function can be activated. As the trailer checking function, a condition of brake system 10 is employed in which the brakes of a trailer connected to the tractor are released while the parking brake function itself is active, in order to give the operator of the tractor an opportunity to check whether the braking action of the parking brake of the tractor is sufficient alone to prevent the entire vehicle train from rolling away if the vehicle is parked. Such a check is necessary particularly for trailers the brakes of which could be released, for example due to gradual pressure loss if the vehicle is parked for a prolonged time. In this case, also, it should be ensured that the vehicle train will not roll away, and, accordingly, this is effected by the parking brake of the tractor.

For actuation, trailer checking valve 162 is connected via electric lines 164 to electronic control unit 140. In a first switched position illustrated in FIG. 2, trailer checking valve 162 places pressure line 106 leading to trailer control valve 100 in communication with compressed air line 156. In its second switched position, trailer checking valve 162 places compressed air line 106 in communication with compressed air supply line 112 or compressed air line 92 and, thus, with the compressed air reservoir of compressed air reservoir tank 90. In this second switched position, the trailer checking function is activated. For this purpose, reservoir pressure is admitted to the pressure control input of trailer control valve 100 in communication with compressed air line 106, thus, bringing about release of the trailer brakes by means of an inverting function of trailer control valve 100.

Relay valve 118 is provided with a relay piston having a bore or orifice 165 (not illustrated) which places outlet 154 of the relay valve in communication with control input 152 in throttled manner. As a result, the working volume of the relay valve is in communication with the control volume, albeit in throttled manner.

During a failure of the electric power supply, monostable valve 120 goes to its parked or vented position illustrated in FIG. 2 and holding valve 138 goes to its passing position illustrated in FIG. 2. As a result, control input 152 of relay valve 118 is pneumatically in communication with venting device 126. Thus, the control volume of the relay valve is vented via venting device 126. However, since the control volume is small and the control volume must not be vented suddenly, compressed air passes via orifice 165 provided in the relay piston from the working volume of relay valve 118 into the control chamber thereof, and, so, the control pressure of relay valve 118 can drop only slowly. Consequently, by means of orifice 165 in the relay piston, the working volume is also vented slowly.

For rapid venting of the spring actuator, a further valve is provided, namely, vent valve 166. Valve 166 is designed as an electromagnetic valve, which, in turn, is electromagnetically connected via electric lines 168 to control unit 140. Valve 166 can, therefore, be electromagnetically actuated via control unit 140. Valve 166 is desirably designed as a 2/2 way solenoid valve. Its inlet 170 is in communication with compressed air line 132, specifically in a portion between vent port 130 of monostable valve 120 and venting device 126; its outlet 172 is in communication indirectly or directly with the atmosphere.

In a deenergized condition, vent valve 166 is in the blocking position illustrated in FIG. 2, meaning that inlet 170 is not in communication with outlet 172 but is shut off therefrom. In an energized position, not illustrated in FIG. 2, inlet 170 is in communication with outlet 172 of vent valve 166. In this venting position, the control chamber of relay valve 118 can be vented suddenly if both holding valve 138 and monostable valve 120 are switched to the switched position illustrated in FIG. 2.

By actuation of vent valve 166, the vehicle is therefore brought into a parked position, specifically, by sudden venting of the spring actuators, and so the parking brake is rapidly applied.

The present invention permits automatic slow and final venting of the spring actuators of the parking brake during failure of the electric power supply of the vehicle, and, so, the vehicle can be slowly braked via the parking brake. A danger to following traffic due to emergency braking can therefore be avoided to the greatest extent.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electro-pneumatic brake control device for a vehicle brake system, the brake system having a parking brake and at least one spring brake cylinder including a spring store part for actuating the parking brake, the electro-pneumatic brake control device comprising:

a venting device comprising a throttle; and valve devices configured to effect a failsafe operating condition that is effectible when supply of electric power fails, the valve devices comprising:
a vent valve in communication with the first compressed air line being switchable to vent the spring store part; and
at least one monostable valve being switchable without being energized such that a first compressed air line to the spring store part of the at least one spring brake cylinder is automatically vented via the venting device in a throttled manner as compared with the vent valve.

2. The brake control device according to claim 1, further comprising an air flow boosting valve device comprising:
a first inlet in communication with a second compressed air line to a compressed air reservoir;
a first outlet in communication with the first compressed air line to the spring store part of the at least one spring brake cylinder; and
a pneumatic control input for supplying a control pressure for controlling the pressure at the first outlet, wherein the control input is vented automatically in a controlled manner in the failsafe operating condition.

3. An electro-pneumatic brake control device for a vehicle brake system, the brake system having a parking brake and at least one spring brake cylinder including a spring store part for actuating the parking brake, and the electro-pneumatic brake control device comprising:
valve devices for effecting at least one of:
a first operating condition in which the valve devices are at least partly energized and are switchable such that air is admitted to a first compressed air line to the spring store part of the at least one spring brake cylinder;
a second operating condition in which the valve devices are at least partly energized and are switchable such that the first compressed air line to the spring store part of the at least one spring brake cylinder is vented suddenly; and
a third operating condition that is effectible when supply of electric power fails, wherein the valve devices are switchable without being energized such that a first compressed air line to the spring store part of the at least one spring brake cylinder is automatically vented in a throttled manner;
an air flow boosting valve device comprising:
a first inlet in communication with a second compressed air line to a compressed air reservoir;
a first outlet in communication with the first compressed air line to the spring store part of the at least one spring brake cylinder; and
a pneumatic control input for supplying a control pressure for controlling the pressure at the first outlet, wherein the control input is vented automatically in a controlled manner in the third operating condition; and
an electrically actuated monostable valve connected to and controlled by an electronic control unit, the monostable valve comprising:
a second inlet in communication with the second compressed air line to the compressed air reservoir; and
a second outlet in communication with the control input of the air flow boosting valve device, wherein the second outlet is in communication with the second inlet when the monostable valve is in an energized driving position, and wherein the second outlet is in communication with a throttled venting device via a third port of the monostable valve when the monostable valve is in a deenergized parked position.

4. The brake control device according to claim 3, wherein the monostable valve is a 3/2 way solenoid valve.

5. The brake control device according to claim 3, wherein:
the valve devices comprise a venting valve connected to and controlled by the electronic control unit;
the third port of said monostable valve is in communication with a third inlet of the venting valve;
a third outlet of the venting valve is in communication with a venting device; and
the third inlet is in communication with the third outlet when the venting valve is energized and the third inlet is shut off from the third outlet when the venting valve is deenergized.

6. The brake control device according to claim 2, wherein:
the air flow boosting valve device is a relay valve comprising a relay piston having an aperture defined therein; and
the first outlet is in communication with the control input in a throttled manner.

7. The brake control device according to claim 3, further comprising an electrically actuated holding valve connected to the electronic control unit and interposed between the control input of the air flow boosting valve device and the second outlet of the monostable valve, wherein the holding valve comprises a fourth inlet and a fourth outlet, and wherein the fourth inlet is in communication with the fourth outlet when the holding valve is deenergized and the fourth inlet is shut off from the fourth outlet when the holding valve is energized.

8. An electrically controlled pneumatic vehicle brake system comprising a service brake and a parking brake, the service brake comprising:
a brake pedal;
compressed air actuated brake cylinders in dynamic communication with the brake pedal;
at least one spring brake cylinder comprising a spring store part for actuating the parking brake, wherein the parking brake comprises a parking brake signal transducer for actuating the parking brake by venting of the spring store part of the at least one spring brake cylinder; and
an electro-pneumatic brake control device according to claim 1.

9. A vehicle having an electrically controlled pneumatic vehicle brake system according to claim 8.

10. The brake control device according to claim 1, wherein the vent valve is in a blocking position in a deenergized condition and in a venting position in an energized condition.

* * * * *

UNITED STATES PATENT AND TRADEMARK OFFICE
CERTIFICATE OF CORRECTION

PATENT NO. : 8,651,588 B2  Page 1 of 1
APPLICATION NO. : 12/084500
DATED : February 18, 2014
INVENTOR(S) : Uwe Bensch et al.

It is certified that error appears in the above-identified patent and that said Letters Patent is hereby corrected as shown below:

In the claims:

Claim 1, in column 9, line 4, should be corrected as follows:

a vent valve in communication with "the" -- a -- first compressed

Claim 3, in column 9, line 42, should be corrected as follows:

Switchable without being energized such that "a" -- the -- first

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,651,588 B2  
APPLICATION NO. : 12/084500  
DATED : February 18, 2014  
INVENTOR(S) : Bensch et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1208 days.

Signed and Sealed this
Twenty-ninth Day of September, 2015

Michelle K. Lee
*Director of the United States Patent and Trademark Office*